United States Patent [19]
Sato

[11] Patent Number: 5,845,859
[45] Date of Patent: Dec. 8, 1998

[54] TAPE REELS AND CARTRIDGES

[75] Inventor: Masanori Sato, Miyagi, Japan

[73] Assignee: Sony Corporation, Japan

[21] Appl. No.: 905,561

[22] Filed: Aug. 4, 1997

[30] Foreign Application Priority Data

Aug. 13, 1996 [JP] Japan ................................. 8-213386

[51] Int. Cl.$^6$ ................................................. B65H 75/22
[52] U.S. Cl. .................. 242/345; 242/608.6; 242/610.6; 242/613; 242/614
[58] Field of Search ..................... 242/345, 608, 242/608.2, 608.6, 608.7, 610.6, 613, 613.4, 613.5

[56] References Cited

U.S. PATENT DOCUMENTS

| | | | |
|---|---|---|---|
| 2,881,985 | 4/1959 | Overmire et al. | 242/613 |
| 3,056,563 | 10/1962 | Whitnah | 242/613.4 |
| 3,104,848 | 9/1963 | Joffe | 242/610.6 |
| 3,715,088 | 2/1973 | Rissberger | 242/610.6 |
| 4,234,137 | 11/1980 | Watanabe et al. | 242/608.6 |
| 4,371,123 | 2/1983 | Watanabe | 242/610.6 |
| 4,523,727 | 6/1985 | Morioka | 242/345 |
| 4,610,555 | 9/1986 | Di Luco | 242/608.2 |
| 5,252,369 | 10/1993 | Akao et al. | 242/610.6 |
| 5,472,150 | 12/1995 | Teuber et al. | 242/345 |
| 5,531,399 | 7/1996 | Weisburn et al. | 242/608.6 |
| 5,676,332 | 10/1997 | Kraus et al. | 242/608.6 |
| 5,699,973 | 12/1997 | Nakane et al. | 242/345 |
| 5,727,752 | 3/1998 | Matsuzoe | 242/608.6 |

*Primary Examiner*—John P. Darling
*Attorney, Agent, or Firm*—Ronald P. Kananen

[57] ABSTRACT

A tape reel includes a main body including an outer peripheral cylinder on which a magnetic tape is wound, a cylindrical bearing disposed in the center of the outer peripheral cylinder, and radial ribs radially extending from the cylindrical bearing. An upper flange is mounted to the tape-reel main body through its protrusions press fit into holes of junctions of the radial ribs.

20 Claims, 10 Drawing Sheets

TAPE REELS AND CARTRIDGES

BACKGROUND OF THE INVENTION

The present invention relates to tape reels for winding a magnetic tape, and tape cartridges having the tape reels therein.

There are conventionally known tape cartridges for densely recording data produced by computers. One of them is disclosed, for example, in Japanese Patent No. 52-14976. This tape cartridge comprises a pair of tape reels rotatably arranged in a casing, a magnetic tape wound on the tape reels, and a drive belt arranged to tightly contact the outermost periphery of the magnetic tape so as to drive the tape.

FIGS. 7A–9 show a known tape reel 30 which comprises an upper flange 31 and a main body 32. The tape reel 30 includes on the lower side three protrusions 31a. The tape-reel main body 32 includes an outer peripheral cylinder 33 on which a magnetic tape is wound, a cylindrical bearing 34 disposed in the center of the outer peripheral cylinder 33 to receive a support shaft of a base plate, and an upper wall 35 for connecting the outer peripheral cylinder 33 and the cylindrical bearing 34. The outer peripheral cylinder 33 includes on the lower side a lower flange 33a protrusively arranged to guide the magnetic tape. The upper wall 35 is formed with three holes 35a into which the protrusions 31a of the upper flange 31 are press fit to mount the upper flange 31 to the tape-reel main body 32. Moreover, arranged below the upper wall 35 are radial ribs 36 for connecting the outer peripheral cylinder 33 and the cylindrical bearing 34. The radial ribs 36 contribute to an improvement in strength of connection between the two.

However, the known tape reel 30 has the following inconvenience. The tape-reel main body 32 is generally manufactured by injection molding of a synthetic resin, so that the upper wall 35 for connecting the outer peripheral cylinder 33 and the cylindrical bearing 34 contracts in the direction of arrows in FIG. 10 after injection molding. This results in occurrence of the difference of approximately 20 $\mu$m maximum in the radial dimension of upper and lower ends of the outer peripheral cylinder 33. This deformation can be restrained by increasing the thickness of the radial ribs 36, which, however, may induce sinking thereon.

Referring to FIG. 11, when using the tape-reel main body 32 deformed as described above, a magnetic tape T is disposed in a pile with a lower end Ta extended, so that the surface of the tape T wound is curved upward as indicated by a one-dot chain line. Moreover, due to greater stress applied to the magnetic tape T at the lower edge than at the upper edge, the tape lower end Ta is fully extended, which does not return to its former state by itself.

Further, referring to FIG. 12, the magnetic tape T contacts a magnetic head 40 to record and reproduce magnetic signals through head gaps 40a. As for the magnetic tape T with the lower end Ta extended, a spacing is produced between the tape T and the head 40, which makes contact of the two incomplete, resulting in a difficulty with correct recording and reproducing of magnetic signals on the tape T.

Furthermore, referring to FIG. 13, the magnetic tape T runs with vertical motion restricted by a tape guide 41. As for the magnetic tape T with the lower end Ta extended, the tape T, which undergoes a great frictional force in the upper portion having no extension, is led upward. However, an upper end Tb of the magnetic tape T interferes with the upper flange 41a of the tape guide 41, the tape T is moved downward. Repeated upward and downward motions of the magnetic tape T means vertical variations thereof, resulting in a difficulty with correct recording and reproducing of magnetic signals on the tape T.

It is, therefore, an object of the present invention to provide tape reels which have less deformation after molding, and allow correct recording and reproducing of magnetic signals on magnetic tapes.

SUMMARY OF THE INVENTION

According to one aspect of the present invention, there is provided a reel for a magnetic tape, comprising:

a main body, said main body including a peripheral cylinder on which the magnetic tape is wound, a cylindrical bearing disposed in the center of said peripheral cylinder, and ribs radially extending from said cylindrical bearing; and a flange mounted to said main body, said flange including protrusions.

Another aspect of the present invention lies in providing a cartridge, comprising:

a casing;

a pair of reels arranged in said casing, each reel having a magnetic tape wound thereon, at least one of said pair of reels comprising:

a main body, said main body including a peripheral cylinder on which said magnetic tape is wound, a cylindrical bearing disposed in the center of said peripheral cylinder, and ribs radially extending from said cylindrical bearing; and a flange mounted to said main body, said flange including protrusions.

DETAILED DESCRIPTION OF THE INVENTION

Figure 1:
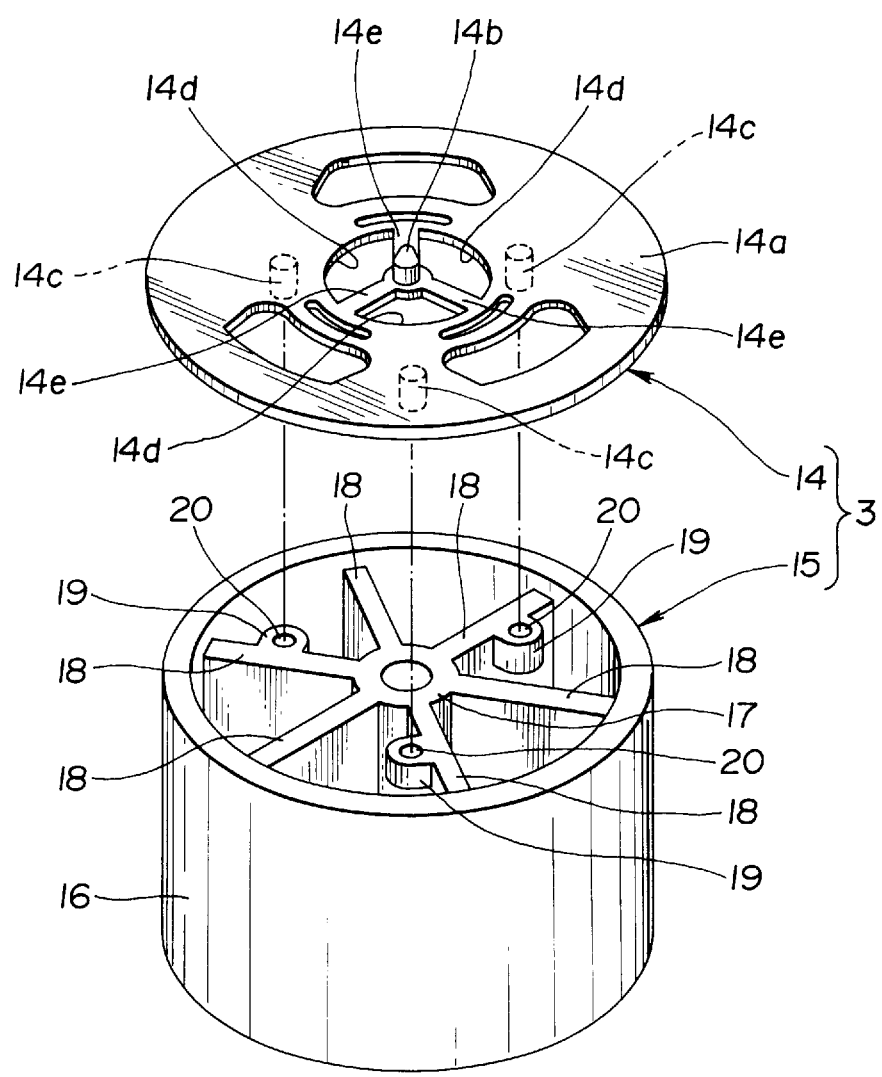
FIG. 1 is an exploded perspective view showing an embodiment of a tape reel according to the present invention.
Figure 2:
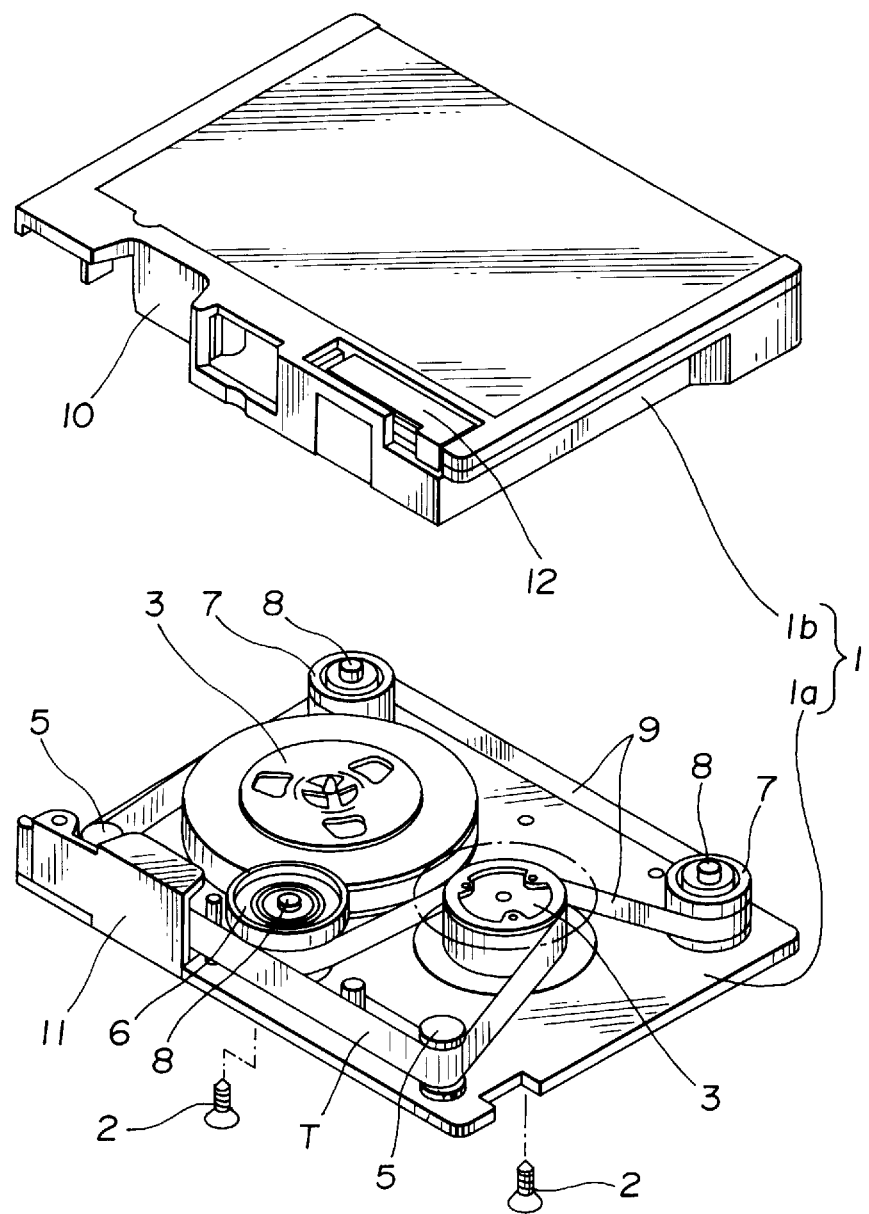
FIG. 2 is a view similar to FIG. 1, showing a tape cartridge.

Referring to FIGS. 1–6C, a tape reel and a tape cartridge having the tape reel therein embodying the present invention will be described. Referring first to FIG. 2, a casing 1 comprises a base plate 1a made of a metal and an upper cover 1b made of a resin such as polycarbonate, the base plate 1a being mounted to the upper cover 1b by screws 2. A pair of tape reels 3 is disposed in the casing 1, and is rotatably supported by support shafts 4 (see FIG. 5) arranged on the base plate 1a. A magnetic tape T is wound on the tape reels 3, and is guided by tape guides 5 arranged on the base plate 1a to run along a given tape running course.

Moreover, a drive roller 6 and a pair of corner rollers 7 are disposed in the casing 1, each being rotatably supported by a shaft pin 8 arranged on the base plate 1a. An endless drive tape 9 interconnects the drive roller 6 and the corner rollers 7, and tightly contacts the outermost periphery of the magnetic tape T wound on the tape reels 3. When the drive roller 6 receives torque to drive the drive belt 9, the tape reels 3 having the magnetic tape T wound thereon are rotated by a frictional force of the drive belt 9 to run the tape T.

The upper cover 1b is formed with a tape opening 10 which is closed by a door 11. The door 11 is opened during installation of the magnetic tape T to a drive unit. A magnetic head of the drive unit contacts the magnetic tape T exposed in the tape opening 10. Moreover, the upper cover 1b includes a file protector 12 for preventing erasing of data recorded on the magnetic tape T.

Referring to FIG. 1, the tape reel 3 comprises an upper flange 14 and a main body 15. The upper flange 14 is made of a resin such as polyacetal, and comprises a disk 14a, a protrusion 14b protrusively arranged in the center of the upper side of the disk 14a, and three protrusions 14c protrusively arranged on the lower side of the disk 14a. A spring 14e is formed in the vicinity of the center of the disk 14a through recesses 14d. The protrusion 14b of the upper flange 14 arranged in the casing 1 is pressed to the upper cover 1b by a given force. With the spring 14e deformed by receiving this force, a downward force always acts on the tape reel 3, contributing to stable rotation thereof.

Figure 3A:
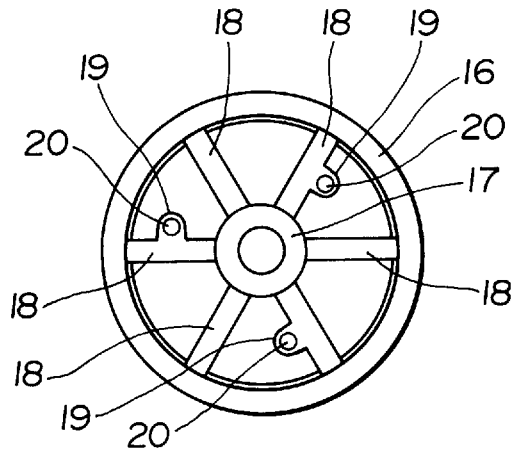
FIG. 3A is a top plan view showing a tape-reel main body.
Figure 3B:
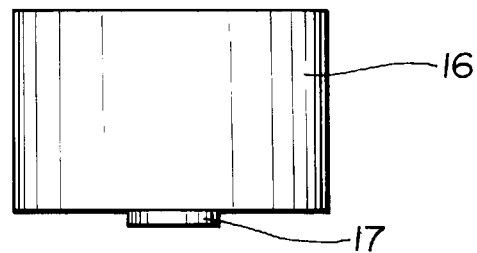
FIG. 3B is a front view showing the tape-reel main body.
Figure 3C:
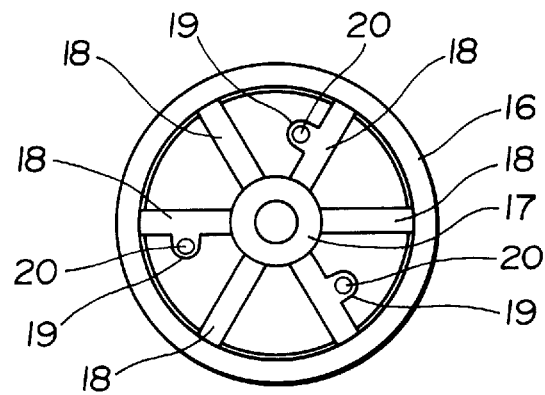
FIG. 3C is a bottom plan view showing the tape-reel main body.

Referring also to FIGS. 3A–3C, the tape-reel main body 15 is made of a resin such as polycarbonate by injection molding, and comprises an outer peripheral cylinder 16 on which the magnetic tape T is wound, a cylindrical bearing 17 disposed in the center of the outer peripheral cylinder 16 to receive the support shaft 4 of the base plate 1a, and six radial ribs 18 radially disposed to the cylindrical bearing 17 and constituting an unique means for connecting the outer peripheral cylinder 16 and the cylindrical bearing 17.

Figure 4:
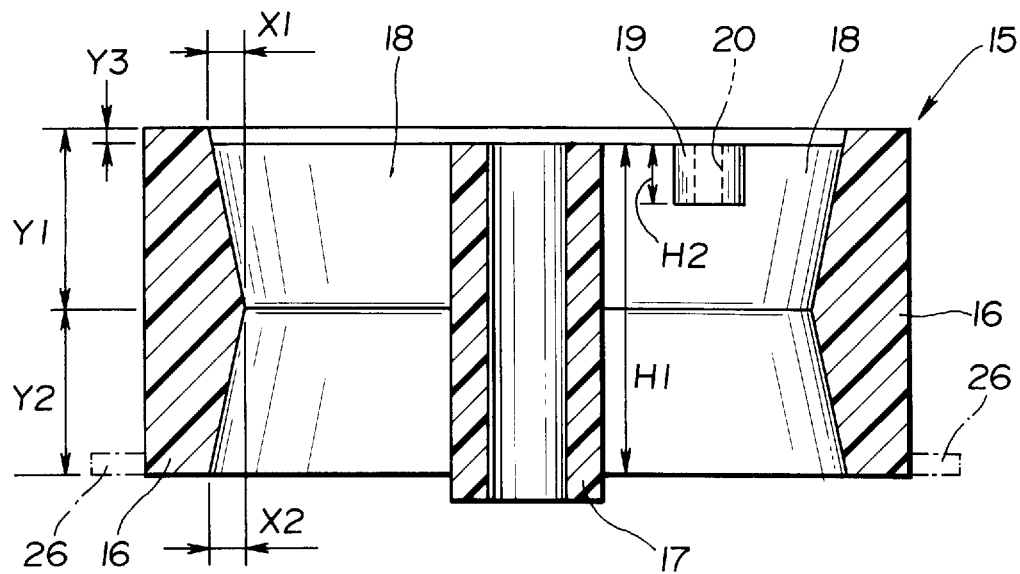
FIG. 4 is a sectional view showing the tape-reel main body.

Referring to FIG. 4, an inner wall of the outer peripheral cylinder 16 is formed with draft tapers having the same heights (Y1=Y2) from the center of the outer peripheral cylinder 16, and the same widths (X1=X2). An outer wall or surface of the outer peripheral cylinder 16 on which the magnetic tape T is wound is formed with a draft taper of at least 1° or less.

Figure 5:
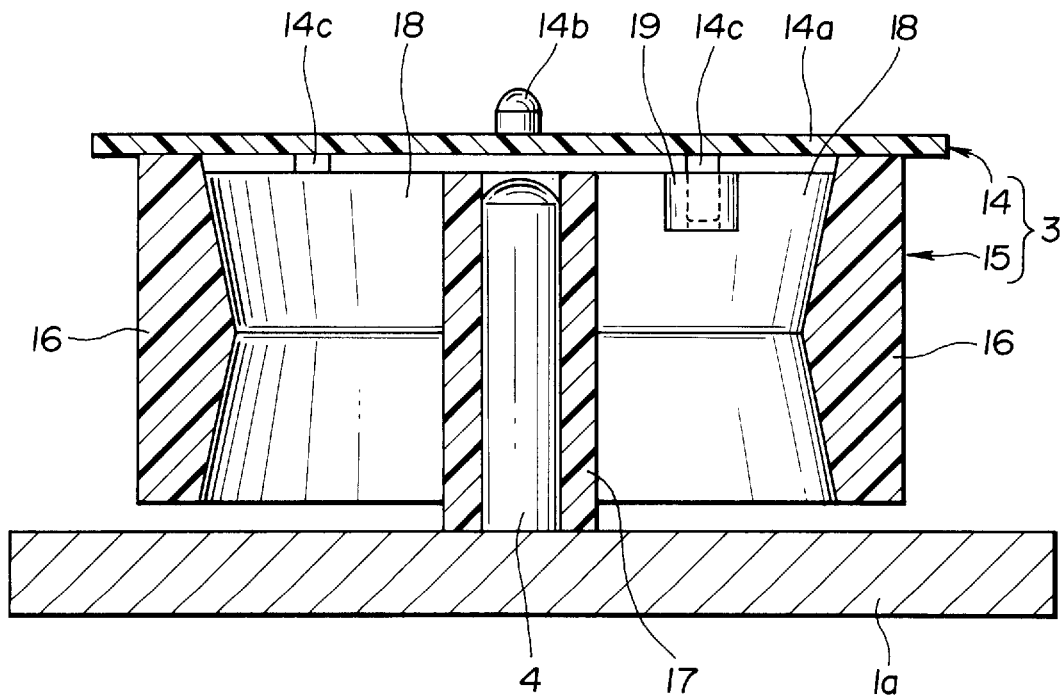
FIG. 5 is a view similar to FIG. 4, showing the tape-reel main body and the tape reel assembled thereto.

Referring to FIG. 5, a lower end of the cylindrical bearing 17 protrudes downward from a lower end of the outer peripheral cylinder 16, and only this contacts the base plate 1a.

As best seen in FIG. 3A or 3C, the six radial ribs 18 are disposed equidistantly, e.g. at intervals of 60°, to perpendicularly contact the cylindrical bearing 17 and the outer peripheral cylinder 16. Junctions 19 are integrated with every two radial ribs 18, each having a hole 20. The protrusions 14c of the upper flange 14 are press fit into the holes 20, respectively, to mount the upper flange 14 to the tape-reel main body 15 as shown in FIG. 5. Referring to FIG. 4, in view of prevented sinking on the radial ribs 18, the height H2 of the junctions 19 is preferably smaller than the height H1 of the radial ribs 18.

Figure 6A:
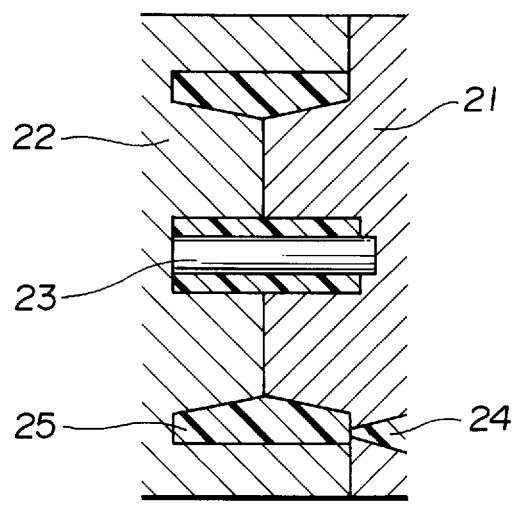
FIGS. 6A–6C are views similar to FIG. 5, each showing the molding process of the tape-reel main body.
Figure 6B:
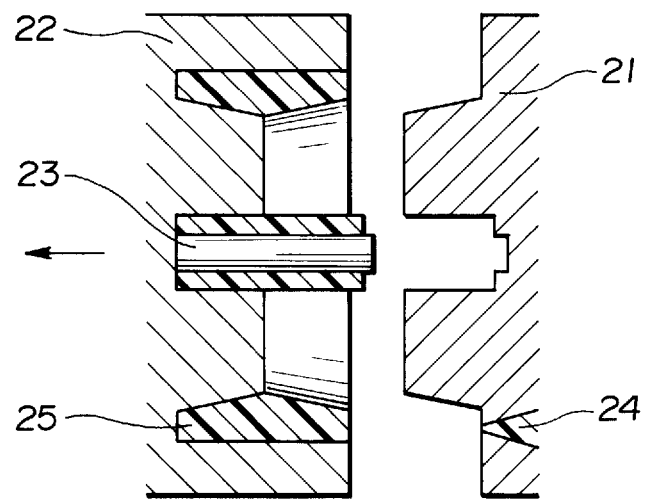
Figure 6C:
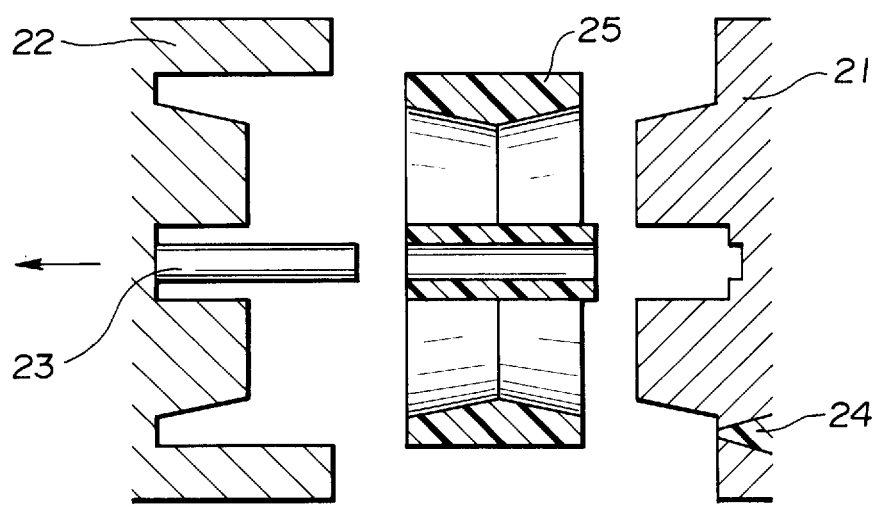
Figure 7A:
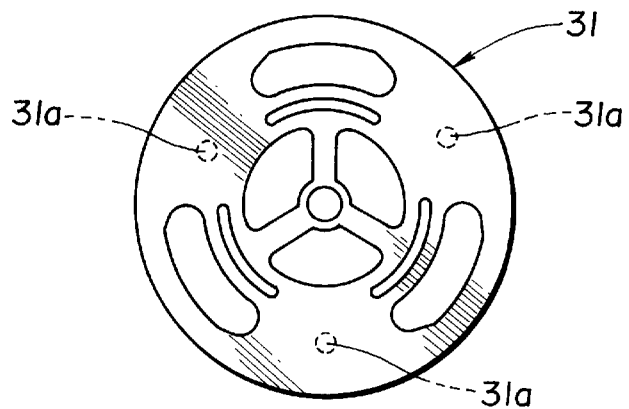
FIG. 7A is a view similar to FIG. 3A, showing a known tape reel.
Figure 7B:
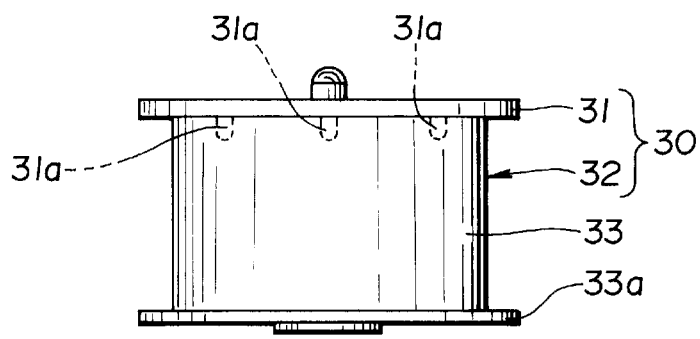
FIG. 7B is a view similar to FIG. 3B, showing the known tape reel.
Figure 7C:
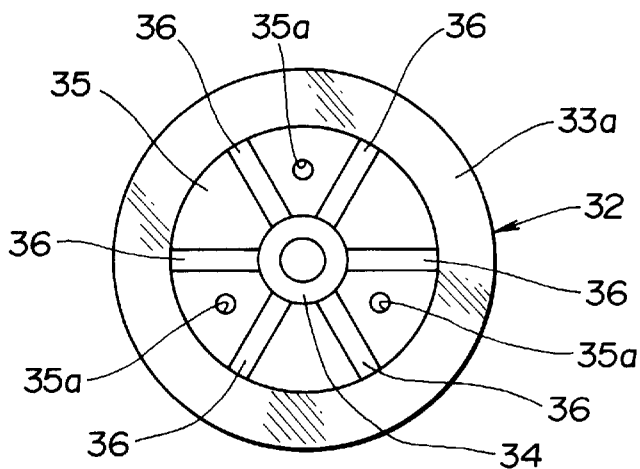
FIG. 7C is a view similar to FIG. 3C, showing the known tape reel.
Figure 8A:
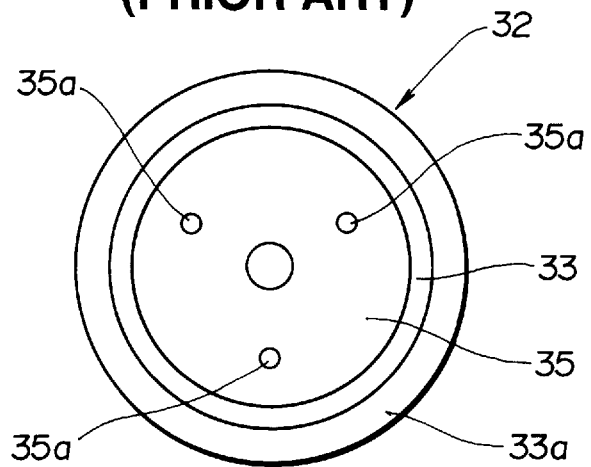
FIG. 8A is a view similar to FIG. 7A, showing a known tape-reel main body.
Figure 8B:
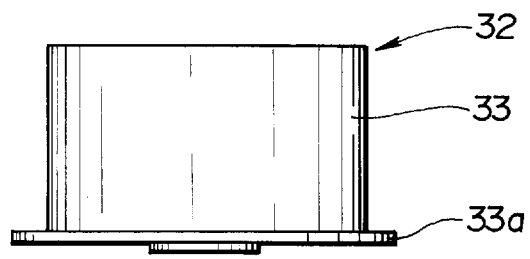
FIG. 8B is a view similar to FIG. 7B, showing the known tape-reel main body.
Figure 8C:
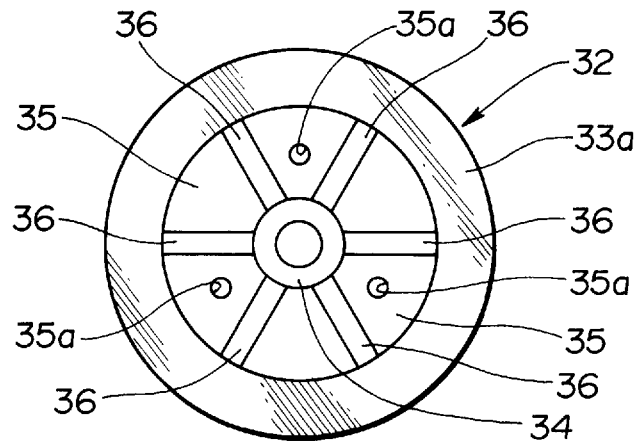
FIG. 8C is a view similar to FIG. 7C, showing the known tape-reel main body.
Figure 9:
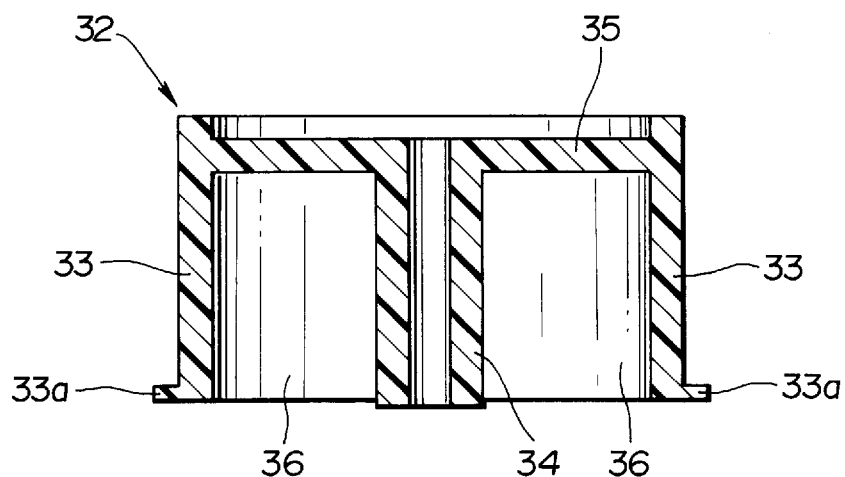
FIG. 9 is a view similar to FIGS. 6A–6C, showing the known tape-reel main body.
Figure 10:
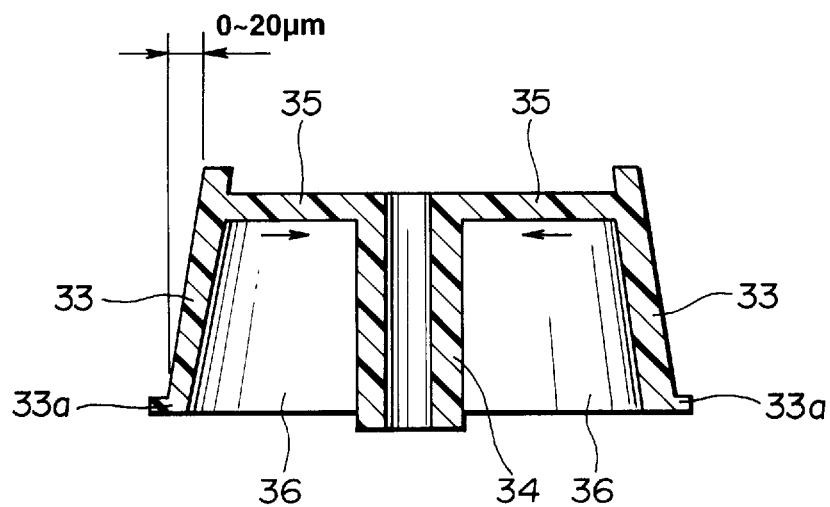
FIG. 10 is a view similar to FIG. 9, showing the known tape-reel main body deformed after molding.
Figure 11:
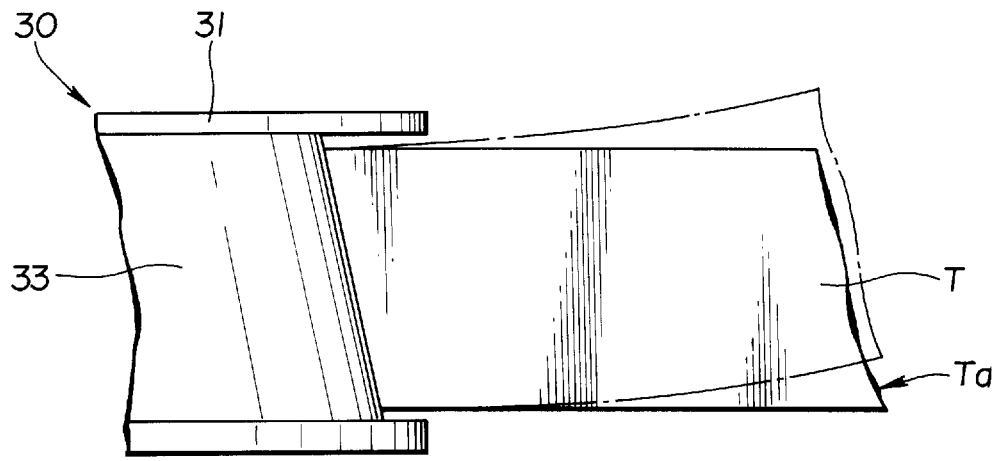
FIG. 11 is a schematic drawing showing a magnetic tape with a lower end extended.
Figure 12:
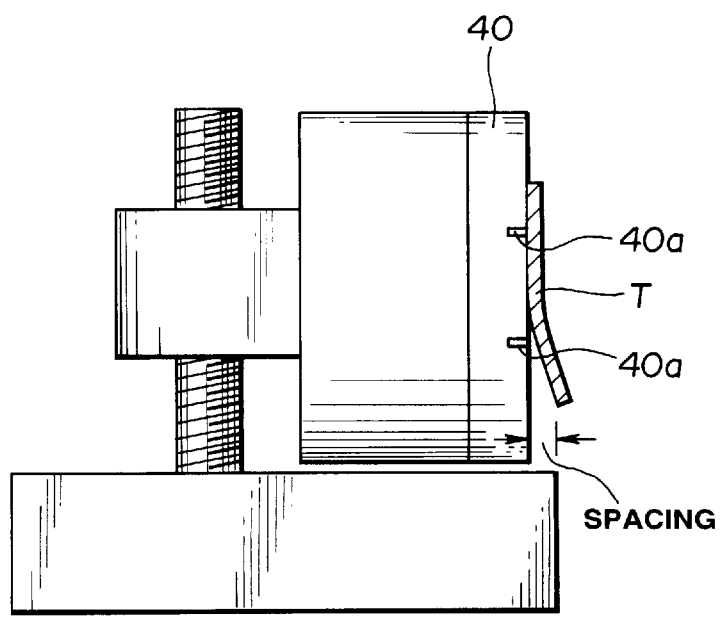
FIG. 12 is a view similar to FIG. 11, showing the magnetic tape with the lower end extended contacting a magnetic head.
Figure 13:
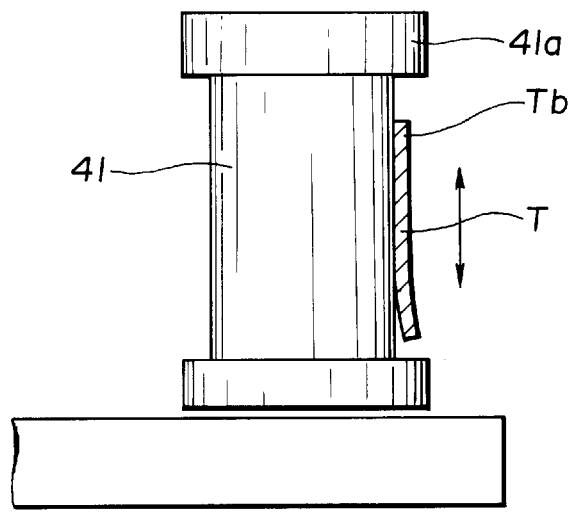
FIG. 13 is a view similar to FIG. 12, showing the magnetic tape with the lower end extended placed on a tape guide.

Referring to FIGS. 6A–6C, right and left molds 21, 22 have in the contact faces thereof a concavity with a given shape. A pin 23 is fixed to the left mold 22 to form a hole for the cylindrical bearing 17.

When making the right mold 21 contact the left mold 22 as shown in FIG. 6A, the concavities of the two define a hermetic space with the same shape as that of the tape-reel main body 15. A melted resin is injected into the hermetic space from an injection gate 24. After solidification of the resin, the left mold 22 is moved in the direction of separating from the right mold 21 as indicated by an arrow as shown in FIG. 6B. Pressed by an eject pin, not shown, arrange to the left mold 22, a resin molding 25 is removed from the left mold 22 as shown in FIG. 6C. Due to the fact that the tape-reel main body 15 is shaped to have upper and lower portions substantially symmetrical without a portion corresponding to the upper wall of the known tape-reel main body, the required time and degree of contraction of the melted resin after molding are substantially the same in the corresponding upper and lower portions of the molds 21, 22. Therefore, the tape-reel main body 15 molded has practically no deformation, causing no extension of a lower end of the magnetic tape T, failing to produce a difficulty with correct recording and reproducing of magnetic signals on the tape T.

Having described the present invention in connection with the preferred embodiment, it is noted that the present invention is not limited thereto, and various changes and modification can be made without departing from the scope of the present invention.

By way of example, the radial ribs 18 are six in the embodiment, alternately, they may be two or more, and preferably three or more in view of the strength.

Further, the present invention is applied to the belt-drive tape cartridge in the embodiment, but it is applicable to all types of tape cartridges having a magnetic tape wound.

Furthermore, the tape-reel main body 15 has no lower flange, alternately, it may include a lower flange 26 as indicated by one-dot chain lines in FIG. 4.

What is claimed is:

1. A reel for a magnetic tape, comprising:
   a main body, said main body including a peripheral cylinder on which the magnetic tape is wound, a cylindrical bearing disposed in the center of said peripheral cylinder, ribs radially extending from said cylindrical bearing, a junction arranged to at least one of said ribs and having a hole; and
   a flange mounted to said main body, said flange including a protrusion being engaged to said hole of said junction when said flange is mounted to said body.

2. A reel as claimed in claim 1, wherein said ribs are three or more.

3. A reel as claimed in claim 1, wherein the peripheral cylinder has first and second open ends and the flange closes one of the first and second open ends when the flange is mounted to the main body.

4. A reel as claimed in claim 3, wherein said cylindrical bearing extends through and beyond the other of the first and second open ends.

5. A reel as claimed in claim 1, wherein the peripheral cylinder has an outer wall on which the magnetic tape is wound and an inner wall having substantially identical draft tapers.

6. A reel as claimed in claim 5, wherein the draft tapers of the inner wall have substantially the same height as measured from the first and second open ends, respectively, of the peripheral cylinder and the same width as measured from the outer surface of the peripheral cylinder.

7. A reel as claimed in claim 5, wherein the outer wall has a draft taper of about 1 degree or less.

8. A cartridge, comprising:
   a casing;
   a pair of reels arranged in said casing, each reel having a magnetic tape wound thereon, at least one of said pair of reels comprising:
   a main body, said main body including a peripheral cylinder on which the magnetic tape is wound, a cylindrical bearing disposed in the center of said peripheral cylinder, ribs radially extending from said cylindrical bearing, a junction arranged to at least one of said ribs and having a hole; and
   a flange mounted to said main body, said flange including a protrusion being engaged to said hole of said junction when said flange is mounted to said body.

9. A cartridge as claimed in claim 8, wherein said ribs are three or more.

10. A reel as claimed in claim 8, wherein a junction is arranged on every other rib.

11. A reel as claimed in claim 8, wherein the peripheral cylinder has first and second open ends and the flange closes one of the first and second open ends when the flange is mounted to the said main body.

12. A reel as claimed in claim 11, wherein said cylindrical bearing extends through and beyond the other of the first and second open ends.

13. A reel as claimed in claim 8, wherein the peripheral cylinder has an outer wall on which the magnetic tape is wound and an inner wall having substantially identical draft tapers.

14. A reel as claimed in claim 13, wherein the draft tapers of the inner wall have substantially the same height as measured from the first and second open ends, respectively, of the peripheral cylinder and the same width as measured from the outer surface of the peripheral cylinder.

15. A reel for a magnetic tape, comprising:
   a main body, said main body including a peripheral cylinder on which the magnetic tape is wound, said peripheral cylinder having first and second open ends, a cylindrical bearing disposed in said center of said peripheral cylinder, and ribs radially extending from said cylindrical bearing; and
   a flange mounted to said main body and covering one of the first and second open ends of the peripheral cylinder, said flange including protrusions.

16. A reel as claimed in claim 15, wherein said main body further includes means for cooperating with said ribs and said protrusions to mount said flange to said main body.

17. A reel as claimed in claim 15, wherein means for mounting said flange to said main body include a junction with a hole on at least one of the ribs and the protrusion of the flange being received within the hole.

18. A reel as claimed in claim 15, wherein the peripheral cylinder has an outer wall on which the magnetic tape is wound and an inner wall having substantially identical draft tapers.

19. A reel as claimed in claim 18, wherein the draft tapers of the inner wall have substantially the same height as measured from the first and second open ends, respectively, of the peripheral cylinder and the same width as measured from the outer surface of the peripheral cylinder.

20. A reel as claimed in claim 18, wherein the outer wall has a draft taper of at least 1 degree or less.

* * * * *